United States Patent

Horiguchi et al.

[11] Patent Number: 6,098,002
[45] Date of Patent: Aug. 1, 2000

[54] APPARATUS AND METHOD FOR CONTROLLING SPEED CHANGE OF A VEHICLE AUTOMATIC TRANSMISSION

[75] Inventors: Masanobu Horiguchi; Hideki Sekiguchi, both of Atsugi, Japan

[73] Assignee: Unisia Jecs Corporation, Kanagawa-ken, Japan

[21] Appl. No.: 09/041,797

[22] Filed: Mar. 13, 1998

[30] Foreign Application Priority Data

Mar. 14, 1997 [JP] Japan ............................ 9-061232

[51] Int. Cl.⁷ .................... G06F 17/00; G06F 19/00
[52] U.S. Cl. .................... 701/51; 701/65; 701/95; 701/96; 477/120; 477/125
[58] Field of Search .................... 701/51, 65, 95, 701/96, 66; 477/120, 125, 901, 904

[56] References Cited

U.S. PATENT DOCUMENTS

| | | |
|---|---|---|
| 4,648,291 | 3/1987 | Klatt et al. . |
| 5,038,880 | 8/1991 | Matsuoka et al. . |
| 5,544,053 | 8/1996 | Nakashima . |
| 5,549,519 | 8/1996 | Seidel et al. . |
| 5,611,753 | 3/1997 | Kondo et al. . |
| 5,618,243 | 4/1997 | Kondo et al. . |

FOREIGN PATENT DOCUMENTS

| | | |
|---|---|---|
| 0 503 945 A2 | 9/1992 | European Pat. Off. . |
| 0 744 564 A2 | 11/1996 | European Pat. Off. . |
| 4-4351 | 1/1992 | Japan . |
| 4-327059 | 11/1992 | Japan . |
| 7-305765 | 11/1995 | Japan . |

Primary Examiner—William A. Cuchlinski, Jr.
Assistant Examiner—Gertrude Arthur
Attorney, Agent, or Firm—McDermott, Will & Emery

[57] ABSTRACT

With a speed change control wherein a speed change step is determined corresponding to the gradient of a road surface on which a vehicle is travelling, an upshift requirement is output at the time of a downslope, based on the gradient being gentle, and a reference acceleration and a reference engine load are set corresponding to vehicle speed, speed change step, and gradient. Then, only when an actual acceleration is greater than or equal to the reference acceleration, and an actual engine load is greater than or equal to the reference engine load, is upshift executed based on the upshift requirement, and for other than the above conditions, the upshift requirement is cancelled.

28 Claims, 3 Drawing Sheets

APPARATUS AND METHOD FOR CONTROLLING SPEED CHANGE OF A VEHICLE AUTOMATIC TRANSMISSION

FIELD OF THE INVENTION

The present invention relates to an apparatus and method for controlling speed change of a vehicle automatic transmission, in particular for controlling speed change at the time of downslope travel of a vehicle.

DESCRIPTION OF THE RELATED ART

It is known with vehicle automatic transmissions, that in order to obtain a speed reduction from engine braking at the time of a downslope, speed change control is carried out to change to a speed change step on a lower speed side than the normal speed change step determined by the throttle opening and engine speed (refer to Japanese Unexamined Patent Publication Nos. 7-305765, 4-327059, and 4-4351).

With the abovementioned speed change control at the time of a downslope, the construction is such that at the time of the downslope, control is to a speed change step which is effective for engine braking, and when for example it is judged that the gradient has become gentle so that the engine breaking is too effective, upshift is carried out.

However, if as mentioned above, upshift is carried out corresponding to the change in gradient, then upshift will be carried out even in the case where the driver does not require upshift, so that the vehicle speed is increased resulting in acceleration irrespective of the intention of the driver. Hence the driver is likely to receive an unexpected sensation. Moreover, in the case where the vehicle is to be stopped, there is the possibility that upshift will occur accompanying the change in gradient, and in this case also, the driver is likely to receive an unexpected sensation.

SUMMARY OF THE INVENTION

The present invention takes into consideration the above problems with the object of providing an apparatus and method for controlling speed change of a vehicle automatic transmission which can appropriately carry out upshift at the time of a downslope so that a driver does not receive an unexpected sensation.

To achieve the above object, the apparatus and method for controlling the speed change of a vehicle automatic transmission is constructed such that an upshift requirement accompanying a gradient change at the time of a downslope is selectively cancelled based on results of comparing vehicle acceleration with a reference acceleration corresponding to vehicle travelling conditions.

With such a construction, then even if an upshift requirement is output due to speed change control at the time of a downslope, then depending on the result of a comparison between the reference acceleration corresponding to travelling conditions and the actual acceleration, the upshift requirement is cancelled, and upshift is only permitted when the beforementioned acceleration conditions have materialized. For example, even if an upshift requirement is output based on the downslope becoming gentle, upshift is not carried out unconditionally based on the upshift requirement, but the appropriateness of an upshift is judged from the acceleration condition at the time to thereby determine whether or not to actually carry out an upshift.

Here, the construction may be such that the upshift requirement is cancelled when the vehicle acceleration is less than the reference acceleration corresponding to vehicle travelling conditions.

With such a construction, when the actual acceleration is less than the reference acceleration, the upshift requirement is cancelled, while when the actual acceleration becomes greater than the reference acceleration, upshift is carried out. For example, under the condition where the gradient of a downslope becomes gentle so that the engine braking is too effective compared to under normal downslope conditions, then if the acceleration remains low with the accelerator left and not operated by the driver, it is assumed that there is a requirement to stop and the upshift is cancelled. On the other hand, when the driver presses the accelerator pedal in response to the engine braking being too effective to thereby intend the increase of acceleration, it is assumed that intermittent travelling is intended, and upshift is permitted.

Furthermore, the construction may be such that the reference acceleration is set based on a speed change step serving as a vehicle travelling condition, and the reference acceleration is set so that the more the speed change step is on the high speed side, the more readily the upshift requirement is cancelled.

With such a construction, the reference acceleration is set so that when the speed change step is on the high speed side, the upshift requirement is readily cancelled, while when on the low speed side, the upshift requirement is readily permitted.

Moreover, the construction may be such that the reference acceleration is set based on vehicle speed serving as a vehicle travelling condition, and the reference acceleration is set so that the lower the vehicle speed, the more readily the upshift requirement is cancelled.

With such a construction, the reference acceleration is set such that when the vehicle speed is low, the upshift requirement is readily cancelled, while when the vehicle speed is high, the upshift requirement is readily permitted.

Furthermore the construction may be such that the reference acceleration is set based on gradient serving as a vehicle travelling condition, and the reference acceleration is set so that the steeper a downslope, the more readily the upshift requirement is cancelled.

With such a construction, the reference acceleration is set such that when the gradient is steep at the time of a downslope, the upshift requirement is readily cancelled, while when even though a downslope, the gradient is gentle, the upshift requirement is readily permitted.

On the other hand, the construction may be such that the upshift requirement is selectively cancelled based on results of comparing the vehicle acceleration with a reference acceleration corresponding to vehicle travelling conditions, and based on results of comparing the engine load with a reference engine load corresponding to vehicle travelling conditions.

With such a construction, it is judged whether or not to cancel the upshift requirement from the acceleration conditions, and also it is judged whether or not to cancel the upshift requirement from engine load conditions represented by throttle opening or the like. Since when engine braking is too effective, the driver carries out throttle operation (accelerator operation) to correct acceleration, then by judging not only acceleration but also the presence of throttle operation, speed change is carried out corresponding accurately to the intentions of the driver.

The construction may be such that the upshift requirement is permitted only when the vehicle acceleration is greater than the reference acceleration corresponding to vehicle travelling conditions, and the engine load is greater than the reference engine load corresponding to vehicle travelling conditions, and otherwise the upshift requirement is cancelled.

With such a construction, upshift is permitted only when an engine load increase is verified and there is a rise in acceleration matching the increase in the engine load, and when the engine load is not large (when the driver is not pressing the accelerator pedal) even though the acceleration is comparatively high, or the acceleration is low even though the engine load is large (even though the driver is pressing the accelerator pedal), then an intention to stop is judged and the upshift requirement is cancelled.

Moreover, the construction may be such that the reference engine load is set based on a speed change step serving as a vehicle travelling condition, and the reference engine load is set so that the more the speed change step is on the high speed side, the more readily the upshift requirement is cancelled.

With such a construction, the reference engine load is set so that when the speed change step is on the high speed side, the upshift requirement is readily cancelled, while when on the low speed side, the upshift requirement is readily permitted.

Furthermore, the construction may be such that the reference engine load is set based on vehicle speed serving as a vehicle travelling condition, and the reference engine load is set so that the lower the vehicle speed, the more readily the upshift requirement is cancelled.

With such a construction, the reference engine load is set such that when the vehicle speed is low, the upshift requirement is readily cancelled, while when the vehicle speed is high, the upshift requirement is readily permitted.

Moreover the construction may be such that the reference engine load is set based on gradient serving as a vehicle travelling condition, and the reference engine load is set so that the steeper a downslope, the more readily the upshift requirement is cancelled.

With such a construction, the reference engine load is set such that when the gradient is steep at the time of a downslope, the upshift requirement is readily cancelled, while when even though a downslope, the gradient is gentle, the upshift requirement is readily permitted.

In the above manner with the setting of either one of the reference acceleration and the reference engine load, when the speed change step is on the low speed side, there is a high possibility of excessive speed reduction and hence upshift is positively permitted, while when the vehicle speed is high, it is judged that there is a low possibility of a deceleration requirement and hence upshift is permitted. Moreover when the gradient is steep, since a speed change shock resulting from an upshift could be generated, then upshift is readily cancelled.

Other objects and aspects of the present invention will become apparent from the following description of embodiments, given in conjunction with the appending drawings.

DESCRIPTION OF THE PREFERRED EMBODIMENT

As follows is a description of an embodiment of the present invention.

Figure 1:
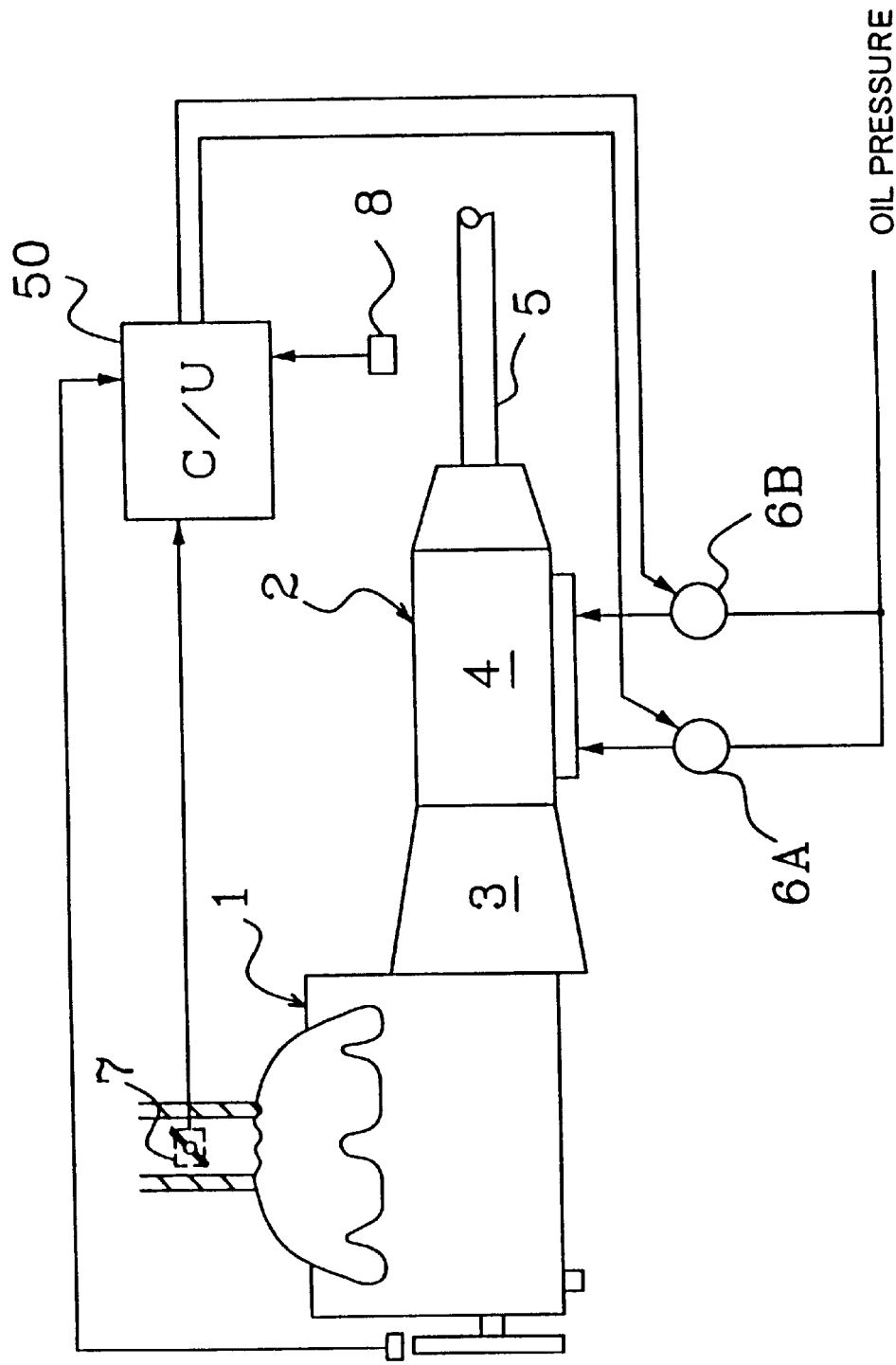
FIG. 1 is a system structural diagram of a vehicle drive system according to an embodiment.

FIG. 1 shows the drive system of a vehicle incorporating an automatic transmission. In FIG. 1, an engine 1 mounted on a vehicle is connected to an automatic transmission 2 so that the generated torque is transmitted to a vehicle drive wheel (not shown in FIG. 1). The automatic transmission 2 comprises a torque converter 3 into which the generated torque of the engine 1 is input through a fluid medium, a multi-step type speed change gear mechanism 4 which takes the output from the torque converter 3 and outputs this after a speed change, and a hydraulic mechanism for driving these.

Solenoid valves 6A, 6B are assembled into the hydraulic mechanism of the speed change gear mechanism 4. By switching open and close combinations of the solenoid valves 6A, 6B, the clamp-release combinations of respective clutches housed in the speed change gear mechanism 4 are changed to thereby effect speed change to a desired speed change step (first to fourth speeds).

ON/OFF control of the plurality of solenoid valves 6A, 6B is carried out based on control signals from a control unit 50 which comprises a CPU, ROM, RAM, A/D converter, input/output interface and so on.

Signals from various sensors are input to the control unit 50.

For the various sensors there is provided, a throttle sensor 7 for generating an output signal corresponding to a throttle opening TVO, and a vehicle speed sensor 8 which detects vehicle speed VSP by detecting a rotational speed of an output shaft of the automatic transmission 2 (output shaft 5).

As follows is a description of a speed change control carried out by the control unit 50 for a downslope road, following the flow chart shown in FIG. 2.

Figure 2:
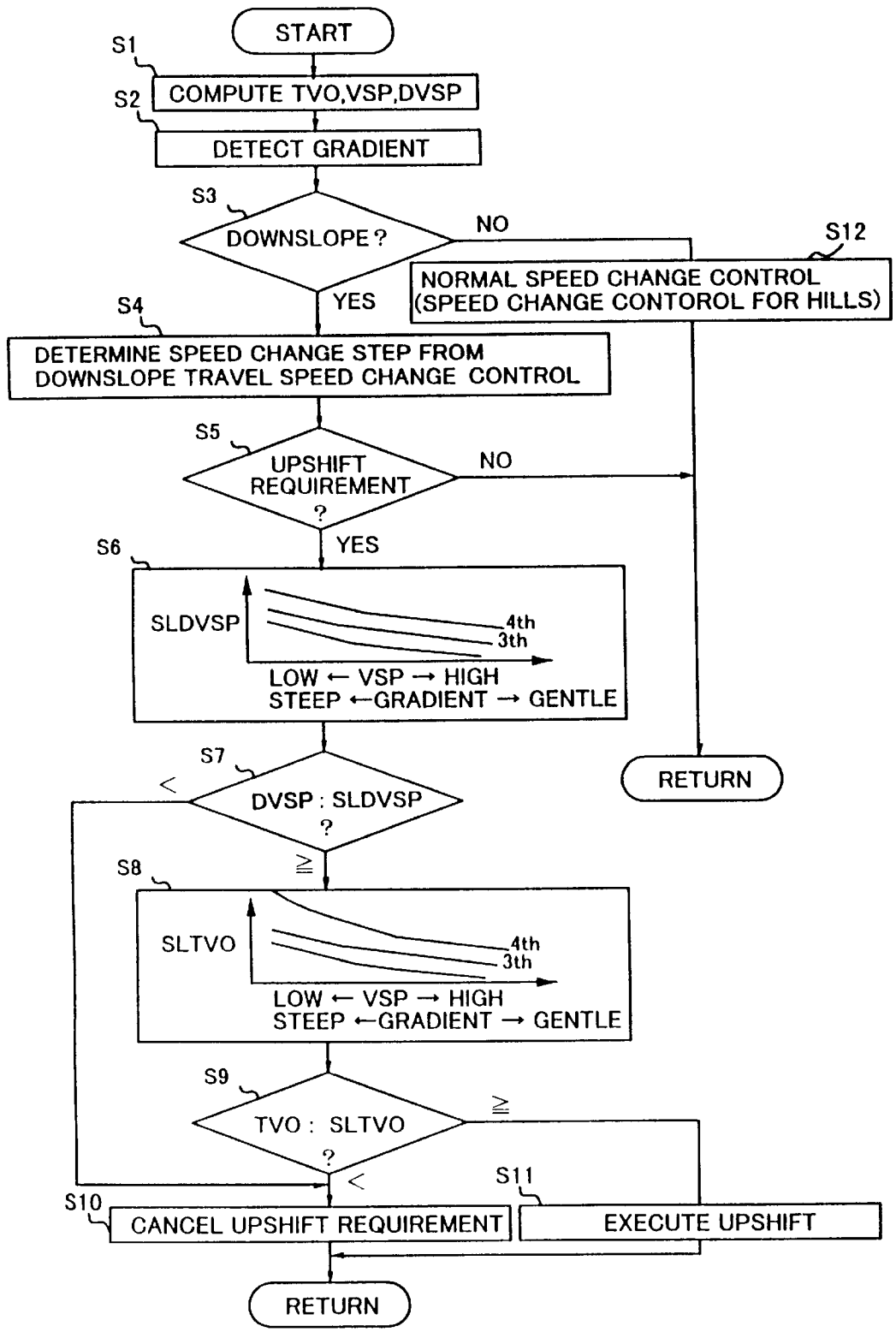
FIG. 2 is a flow chart illustrating an aspect of a control for speed change at the time of a downslope according to the embodiment.
Figure 3:
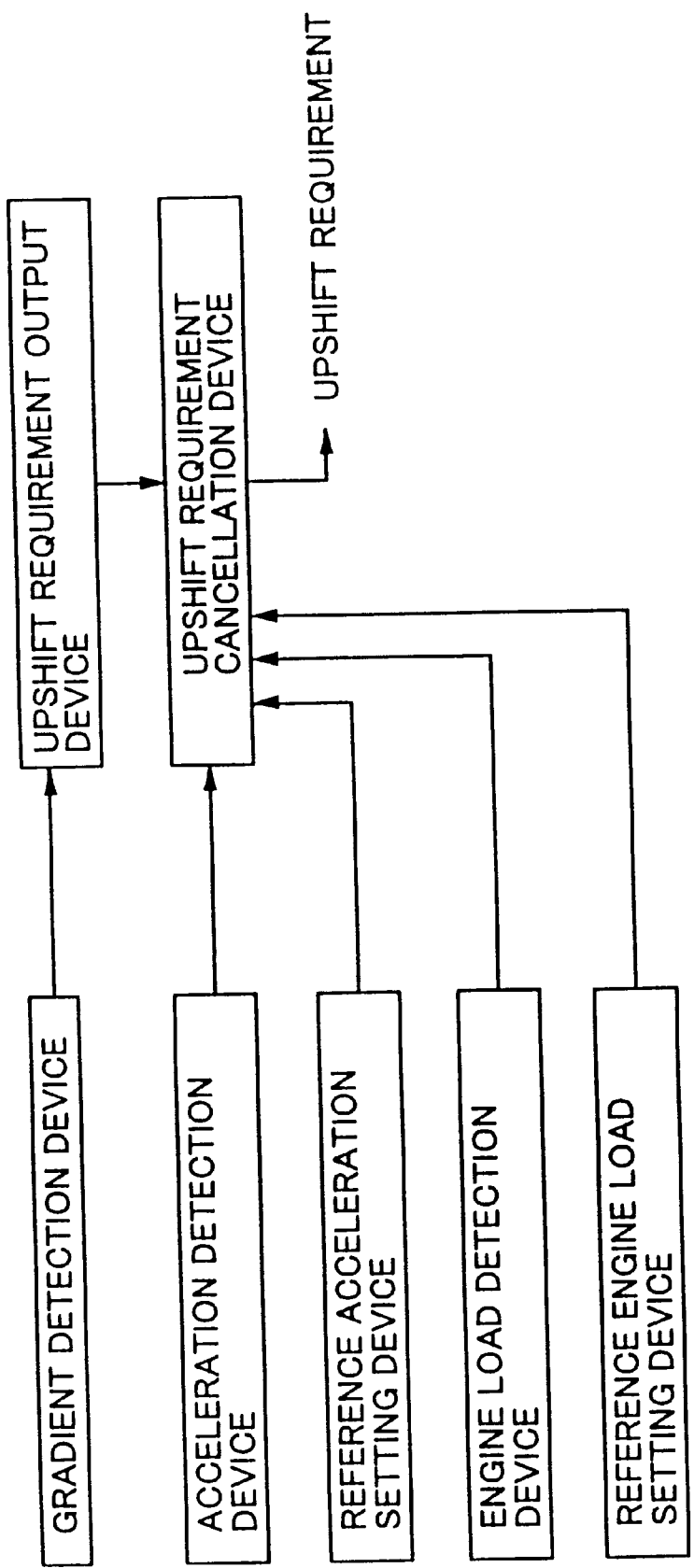
FIG. 3 is a control block diagram which brings together the functions of speed change control at the time of a downslope, illustrated by the embodiment.

With the flow chart shown in FIG. 2, in step S1, throttle opening TVO, vehicle speed VSP, DVSP corresponding to acceleration being the change amount of the vehicle speed VSP per unit time, are computed. The throttle opening TVO is a value representing engine load, and the throttle sensor 7 for detecting throttle opening TVO corresponds to an engine load detection device (refer to FIG. 3). The function of computing the change amount DVSP of the vehicle speed VSP per unit time, corresponds to an acceleration detection device (refer to FIG. 3).

In step S2 (gradient detection device: refer to FIG. 3), the gradient of the road surface on which the vehicle is travelling is detected.

Detection of the road surface gradient can be carried out using a gradient sensor. However, this can also be obtained as a gradient resistance (gradient resistance being the main travelling resistance) by obtaining the turbine torque (torque converter output shaft torque) from the turbine rotational speed and throttle opening, and obtaining the drive force based on the turbine torque and the speed change step, then estimating rolling resistance and air resistance based on vehicle speed, and obtaining acceleration resistance from acceleration obtained as a change amount of vehicle speed, and subtracting the rolling resistance and air resistance and the acceleration resistance from the drive force.

In step S3, it is judged from the detection results from step S2, whether or not the travelling road surface of the vehicle is a downslope. When this is not a downslope, control proceeds to step S12 to change to normal speed change mode or speed change control for an upslope.

On the other hand, when there is a downslope, control proceeds to step S4 to execute speed change control for a downslope.

With speed change control at the time of a downslope, when the downslope is gentle normal speed change control corresponding to vehicle speed and throttle opening is carried out, while when the downslope is steep, control is carried out to hold this at a predetermined speed change step (for example third speed).

With a steeper downslope, the held speed change step may be shifted to the lower speed side. Furthermore, the hold region (including the type of hold speed change steps) corresponding to the vehicle speed and gradient, and the normal control region, may be mapped so that a speed change step on the high speed side is selected at the time of higher vehicle speed. Provided that in either case, when the downslope becomes gentle so that the engine braking is too effective at a speed change step on the low speed side, then an upshift requirement is output, the resultant function thus corresponds to an upshift requirement output device (refer to FIG. 3).

In step S4, a speed change step at the time of a downslope is determined as described above, and then in the next step S5, it is judged if the result of the speed change step selection in step S4 is for an upshift requirement.

If an upshift requirement is output, control proceeds to step S6 (reference acceleration setting device: refer to FIG. 3) to carry out setting of a reference acceleration SLDVSP.

In step S6, setting of the reference acceleration SLDVSP is carried out based on a current or post upshift speed change step, the vehicle speed VSP, and the gradient, with the reference acceleration SLDVSP being set smaller the higher the vehicle speed VSP, the more gentle the downslope, and the more the current or post upshift speed change step is on the low speed side.

With the reference acceleration SLDVSP, the smaller the value thereof then the more readily an upshift requirement is permitted. Therefore the upshift requirement is more readily permitted the higher the vehicle speed VSP, the more gentle the downslope, and the more that the current or post upshift speed change step is on the low speed side. In other words, the upshift requirement is more readily cancelled the lower the vehicle speed VSP, the steeper the downslope, and the more the current or post upshift speed change step is on the high speed side.

Here the construction may be such that rather than one where all of the parameters of, the current or post upshift speed change step, the vehicle speed VSP, and the gradient are used, the reference acceleration SLDVSP is set from only one of these parameters, or a combination of; the current or post upshift speed change step and the vehicle speed VSP, the current or post upshift speed change step and the gradient, or the gradient and the vehicle speed VSP. Moreover, if upshift is limited for example from third speed to fourth speed, then the change of the reference acceleration SLDVSP based on the speed change step is omitted.

The setting is such that when the downslope is steep, since a speed change shock resulting from an upshift could be generated, the trend is to more readily cancel an upshift requirement. Moreover when the speed change step is on the low speed side, since there is the high possibility of excessive speed reduction, the trend is to more readily permit an upshift requirement. Furthermore with upshift when the vehicle speed is low, since, in contrast to when the vehicle speed is high where even if an upshift is permitted there is minimal influence on deceleration, there is the possibility of giving a speed change shock, the trend is to more readily cancel the upshift.

In step S7, the reference acceleration SLDVSP and the vehicle speed change amount DVSP corresponding to the actual acceleration are compared.

If the change amount DVSP is less than the reference acceleration SLDVSP, control proceeds to step S10 where the upshift requirement generated by the process of step S4 is cancelled, and processing is carried out to prohibit an upshift requirement due to the processing of step S4.

On the other hand, if the change amount DVSP is greater than or equal to the reference acceleration SLDVSP, control proceeds to step S8 (reference engine load setting device: refer to FIG. 3) where a reference engine load SLTVO (reference opening) is set based on the vehicle speed VSP, the gradient, and the current or post upshift speed change step.

Here however, the reference engine load SLTVO is set lower the higher the vehicle speed VSP, the more gentle the downslope, and the more the current or post upshift speed change step is towards the low speed side, so that the upshift requirement is more readily permitted. Moreover, as with the reference acceleration SLDVSP, the construction may be such that the reference engine load SLTVO is set from; one of the three parameters, or a combination of; the current or post upshift speed change step and the vehicle speed VSP, the current or post upshift speed change step and the gradient, or the gradient and the vehicle speed VSP.

In step S9, the reference engine load SLTVO and the throttle opening TVO which is representative of engine load are compared.

If the throttle opening TVO is less than the reference engine load SLTVO (reference opening), control proceeds to step S10 (upshift requirement cancellation device: refer to FIG. 3) to cancel the upshift requirement, while if the throttle opening TVO is greater than or equal to the reference engine load SLTVO, control proceeds to step S11 to execute upshift.

In this way, only when the actual acceleration DVSP is greater than or equal to the reference acceleration SLDVSP, and the throttle opening TVO is greater than or equal to the reference engine load SLTVO, is upshift executed.

With such a construction, even though an upshift requirement may arise at the time of a downslope, upshift is only executed when the acceleration and the engine load (throttle opening) are both greater than or equal to the reference value. Therefore, in the case where the driver intends to stop so that a comparatively large deceleration is acceptable, then execution of unnecessary upshift can be avoided, and the driver does not receive an unexpected sensation due to an unnecessary upshift during speed reduction up until stopping.

Furthermore, by changing the reference for judging whether or not to cancel the upshift requirement, in accordance with the vehicle speed, the gradient, and the speed change step, then it is possible to cancel the upshift requirement appropriately without being dependant on changes in these travelling conditions.

In the above, the suitableness of the actual upshift accompanying the upshift requirement is judged from the acceleration condition as well as from the engine load (throttle opening) condition. However, the construction may be such that cancellation of the upshift requirement is carried out from only the acceleration conditions. However, by adding the engine load (throttle opening) condition, then the intention of the driver can be more accurately judged.

Furthermore, engine load has been represented by throttle opening. However engine load may be represented by intake air quantity or fuel injection quantity.

What is claimed is:

1. An apparatus for controlling the speed change of a vehicle automatic transmission, said apparatus comprising:

gradient detection means for detecting a gradient of a road surface on which the vehicle is travelling;

upshift requirement output means for outputting based on a gradient detected by said gradient detection means, an upshift requirement at the time of a downslope;

acceleration detection means for detecting a vehicle acceleration;

reference acceleration setting means for setting a reference acceleration from vehicle travelling conditions; and upshift requirement cancellation means for selectively canceling an upshift requirement output from said upshift requirement output means, based on results of comparing said vehicle acceleration with said reference acceleration;

wherein said upshift requirement cancellation means cancels the upshift requirement output from said upshift requirement output means when said acceleration is less than said reference acceleration.

2. An apparatus for controlling the speed change of a vehicle automatic transmission, said apparatus comprising:

gradient detection means for detecting a gradient of a road surface on which the vehicle is travelling;

upshift requirement output means for outputting based on a gradient detected by said gradient detection means, an upshift requirement at the time of a downslope;

acceleration detection means for detecting a vehicle acceleration;

reference acceleration setting means for setting a reference acceleration from vehicle travelling conditions; and upshift requirement cancellation means for selectively canceling an upshift requirement output from said upshift requirement output means, based on results of comparing said vehicle acceleration with said reference acceleration;

wherein said reference acceleration setting means sets the reference acceleration based on a speed change step serving as a vehicle travelling condition, and said reference acceleration is set so that the more the speed change step is on the high speed side, the more readily the upshift requirement is cancelled.

3. An apparatus for controlling the speed change of a vehicle automatic transmission according to claim 2, wherein said upshift requirement cancellation means cancels the upshift requirement output from said upshift requirement output means when said acceleration is less than said reference acceleration.

4. An apparatus for controlling the speed change of a vehicle automatic transmission, said apparatus comprising:

gradient detection means for detecting a gradient of a road surface on which the vehicle is travelling;

upshift requirement output means for outputting based on a gradient detected by said gradient detection means, an upshift requirement at the time of a downslope;

acceleration detection means for detecting a vehicle acceleration;

reference acceleration setting means for setting a reference acceleration from vehicle travelling conditions; and upshift requirement cancellation means for selectively canceling an upshift requirement output from said upshift requirement output means, based on results of comparing said vehicle acceleration with said reference acceleration;

wherein said reference acceleration setting means sets the reference acceleration based on a vehicle speed serving as a vehicle travelling condition, and said reference acceleration is set so that the lower the vehicle speed, the more readily the upshift requirement is cancelled.

5. An apparatus for controlling the speed change of a vehicle automatic transmission according to claim 4, wherein said upshift requirement cancellation means cancels the upshift requirement output from said upshift requirement output means when said acceleration is less than said reference acceleration.

6. An apparatus for controlling the speed change of a vehicle automatic transmission, said apparatus comprising:

gradient detection means for detecting a gradient of a road surface on which the vehicle is travelling;

upshift requirement output means for outputting based on a gradient detected by said gradient detection means, an upshift requirement at the time of a downslope;

acceleration detection means for detecting a vehicle acceleration;

reference acceleration setting means for setting a reference acceleration from vehicle travelling conditions; and upshift requirement cancellation means for selectively canceling an upshift requirement output from said upshift requirement output means, based on results of comparing said vehicle acceleration with said reference acceleration;

wherein there is provided;
engine load detection means for detecting engine load, and
reference engine load setting means for setting a reference engine load from vehicle travelling conditions, and
said upshift requirement cancellation means selectively cancels an upshift requirement output from said upshift requirement output means based on results of comparing said vehicle acceleration with said reference acceleration, and results of a comparing said engine load with said reference engine load.

7. An apparatus for controlling the speed change of a vehicle automatic transmission according to claim 6, wherein said upshift requirement cancellation means permits the upshift requirement output from said upshift requirement output means only when said acceleration is greater than said reference acceleration, and said engine load is greater than said reference engine load, and otherwise cancels said upshift requirement.

8. An apparatus for controlling the speed change of a vehicle automatic transmission according to claim 6, wherein said reference engine load setting means sets the reference engine load based on a speed change step serving as a vehicle travelling condition, and said reference engine load is set so that the more the speed change step is on the high speed side, the more readily the upshift requirement is cancelled.

9. An apparatus for controlling the speed change of a vehicle automatic transmission according to claim 6, wherein said reference engine load setting means sets the reference engine load based on a vehicle speed serving as a vehicle travelling condition, and said reference engine load is set so that the lower the vehicle speed, the more readily the upshift requirement is cancelled.

10. An apparatus for controlling the speed change of a vehicle automatic transmission according to claim 6, wherein said reference engine load setting means sets the reference engine load based on gradient serving as a vehicle travelling condition, and said reference engine load is set so that the steeper a downslope, the more readily the upshift requirement is cancelled.

11. An apparatus for controlling the speed change of a vehicle automatic transmission according to claim 6, wherein said upshift requirement cancellation means cancels an upshift requirement output from said upshift requirement output means when said vehicle acceleration is less than said reference acceleration, and cancels an upshift requirement output from said upshift requirement output means when said engine load is less than said reference engine load.

12. An apparatus for controlling the speed change of a vehicle automatic transmission according to claim 6, wherein said upshift requirement cancellation means cancels the upshift requirement output from said upshift requirement output means when said acceleration is less than said reference acceleration.

13. An apparatus for controlling the speed change of a vehicle automatic transmission, said apparatus comprising:

gradient detection means for detecting a gradient of a road surface on which the vehicle is travelling;

upshift requirement output means for outputting based on a gradient detected by said gradient detection means, an upshift requirement at the time of a downslope;

acceleration detection means for detecting a vehicle acceleration;

reference acceleration setting means for setting a reference acceleration from vehicle travelling conditions; and upshift requirement cancellation means for selectively canceling an upshift requirement output from said upshift requirement output means, based on results of comparing said vehicle acceleration with said reference acceleration;

wherein said reference acceleration setting means sets the reference acceleration based on gradient serving as a vehicle travelling condition, and said reference acceleration is set so that the steeper a downslope, the more readily the upshift requirement is cancelled.

14. An apparatus for controlling the speed change of a vehicle automatic transmission according to claim 13, wherein said upshift requirement cancellation means cancels the upshift requirement output from said upshift requirement output means when said acceleration is less than said reference acceleration.

15. A method of controlling the speed change of a vehicle automatic transmission wherein a speed change step at the time of a downslope is determined based on a gradient of a road surface on which the vehicle is travelling, and when a speed change requirement based on the determined speed change step is for an upshift, the vehicle acceleration is compared with a reference acceleration corresponding to vehicle travelling conditions, and said upshift requirement is selectively cancelled based on the results of said comparison; and wherein an upshift requirement is cancelled when vehicle acceleration is less than a reference acceleration corresponding to vehicle travelling conditions.

16. A method of controlling the speed change of a vehicle automatic transmission wherein a speed change step at the time of a downslope is determined based on a gradient of a road surface on which the vehicle is travelling, and when a speed change requirement based on the determined speed change step is for an upshift, the vehicle acceleration is compared with a reference acceleration corresponding to vehicle travelling conditions, and said upshift requirement is selectively cancelled based on the results of said comparison; and wherein said reference acceleration is set based on a speed change step serving as a vehicle travelling condition, and said reference acceleration is set so that the more the speed change step is on the high speed side, the more readily the upshift requirement is cancelled.

17. A method of controlling the speed change of a vehicle automatic transmission according to claim 16, wherein an upshift requirement is cancelled when vehicle acceleration is less than a reference acceleration corresponding to vehicle travelling conditions.

18. A method of controlling the speed change of a vehicle automatic transmission wherein a speed change step at the time of a downslope is determined based on a gradient of a road surface on which the vehicle is travelling, and when a speed change requirement based on the determined speed change step is for an upshift, the vehicle acceleration is compared with a reference acceleration corresponding to vehicle travelling conditions, and said upshift requirement is selectively cancelled based on the results of said comparison; and wherein said reference acceleration is set based on a vehicle speed serving as a vehicle travelling condition, and said reference acceleration is set so that the lower the vehicle speed, the more readily the upshift requirement is cancelled.

19. A method of controlling the speed change of a vehicle automatic transmission according to claim 18, wherein an upshift requirement is cancelled when vehicle acceleration is less than a reference acceleration corresponding to vehicle travelling conditions.

20. A method of controlling the speed change of a vehicle automatic transmission wherein a speed change step at the time of a downslope is determined based on a gradient of a road surface on which the vehicle is travelling, and when a speed change requirement based on the determined speed change step is for an upshift, the vehicle acceleration is compared with a reference acceleration corresponding to vehicle travelling conditions, and said upshift requirement is selectively cancelled based on the results of said comparison; and wherein said reference acceleration is set, based on gradient serving as a vehicle travelling condition, and said reference acceleration is set so that the steeper a downslope, the more readily the upshift requirement is cancelled.

21. A method of controlling the speed change of a vehicle automatic transmission according to claim 20, wherein an upshift requirement is cancelled when vehicle acceleration is less than a reference acceleration corresponding to vehicle travelling conditions.

22. A method of controlling the speed change of a vehicle automatic transmission wherein a speed change step at the time of a downslope is determined based on a gradient of a road surface on which the vehicle is travelling, and when a speed change requirement based on the determined speed change step is for an upshift, the vehicle acceleration is compared with a reference acceleration corresponding to vehicle travelling conditions, and said upshift requirement is selectively cancelled based on the results of said comparison; and wherein said upshift requirement is selectively cancelled based on the results of comparing the vehicle acceleration with the reference acceleration corresponding to a vehicle travelling condition, and the results of a comparing engine load with a reference engine load corresponding to a vehicle travelling condition.

23. A method of controlling the speed change of a vehicle automatic transmission according to claim 22, wherein the upshift requirement is permitted only when the vehicle acceleration is greater than the reference acceleration corresponding to a vehicle travelling condition, and the engine load is greater than the reference engine load corresponding to a vehicle travelling condition, and otherwise the upshift requirement is cancelled.

24. A method of controlling the speed change of a vehicle automatic transmission according to claim 22, wherein the reference engine load is set based on a speed change step serving as a vehicle travelling condition, and said reference engine load is set so that the more the speed change step is on the high speed side, the more readily the upshift requirement is cancelled.

25. A method of controlling the speed change of a vehicle automatic transmission according to claim 22, wherein the reference engine load is set based on a vehicle speed serving as a vehicle travelling condition, and said reference engine load is set so that the lower the vehicle speed, the more readily the upshift requirement is cancelled.

26. A method of controlling the speed change of a vehicle automatic transmission according to claim 22, wherein the reference engine load is set based on gradient serving as a vehicle travelling condition, and said reference engine load is set so that the steeper a downslope, the more readily the upshift requirement is cancelled.

27. A method of controlling the speed change of a vehicle automatic transmission according to claim 22, wherein said upshift requirement is cancelled when said vehicle acceleration is less than said reference acceleration and wherein said upshift requirement is cancelled when said engine load is less than a reference engine load which corresponds to a vehicle travelling condition.

28. A method of controlling the speed change of a vehicle automatic transmission according to claim 22, wherein an upshift requirement is cancelled when vehicle acceleration is less than a reference acceleration corresponding to vehicle travelling conditions.

* * * * *